UNITED STATES PATENT OFFICE.

HUGO WOLFF, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

ANTHRACENE DYE AND PROCESS OF MAKING SAME.

No. 893,412.     Specification of Letters Patent.     Patented July 14, 1908.

Application filed March 12, 1908. Serial No. 420,741.

*To all whom it may concern:*

Be it known that I, HUGO WOLFF, doctor of philosophy and chemist, subject of the Grand Duke of Baden, residing at Ludwigshafen-on-the-Rhine, Germany, have invented new and useful Improvements in Anthracene Dyes and Processes of Making the Same, of which the following is a specification.

I have discovered that by treating amino derivatives of compounds containing a benzanthrone group, such for instance as benzanthrone, benzanthrone quinolin, and derivatives of these compounds, with a metallic salt, or oxid, which acts as a condensing agent, such for instance as cuprous chlorid, ferric chlorid, and mercuric chlorid, mercuric oxid, cuprous oxid, cupric oxid, manganese dioxid, chromic acid, lead oxid, and lead peroxid, new coloring matters can be obtained which dye vegetable fiber from the vat very fast yellow, to brown-red, shades. Either one of these salts, or oxids, a mixture of two, or more, of them, may be used.

My new coloring matters are characterized by being insoluble in water and in dilute acids and alkalies, difficultly soluble in quinolin yielding brown to brown-red solutions, soluble in concentrated sulfuric acid yielding from reddish brown to violet-blue solutions, and soluble in alkaline hydrosulfite solution yielding olive-green to brown-red vats which dye unmordanted cotton yellow to violet-brown shades.

The following examples will serve to illustrate further the nature of my invention and the method of carrying it into practical effect, but the invention is not confined to these examples. The parts are by weight.

Example 1. Boil together ten (10) parts of monoaminobenzanthrone (obtainable by reducing the nitro compound described in example 1 of the specification of British Letters Patent No. 12,518/06), six (6) parts of anhydrous sodium acetate, four (4) parts of cuprous chlorid, and one hundred and fifty (150) parts of nitrobenzene. When a test portion shows that no unaltered aminobenzanthrone is present, allow the mass to cool, dilute with alcohol, filter off the coloring matter and wash it first with alcohol, then with hydrochloric acid, and finally with water. The brown-yellow powder so obtained can be converted into an olive-green paste by dissolving it in sulfuric acid and reprecipitating it with water. It is insoluble in water, dilute acids and alkalies. With caustic soda and hydrosulfite it yields an olive-green vat which colors cotton olive-green and these shades on washing and drying, become a beautiful yellow. The coloring matter yields a violet-blue solution with a brown-red fluorescence in concentrated sulfuric acid; it is very difficultly soluble in organic solvents yielding a yellowish brown solution. If, in this example, instead of aminobenzanthrone, a bromin derivative thereof (obtainable for instance by treating aminobenzanthrone with bromin in glacial acetic acid solution) be employed, a coloring matter is obtained possessing properties very similar to those hereinbefore described.

Example 2. Boil together for six (6) hours ten (10) parts of diaminobenzanthrone (obtainable by reducing the nitro compound described in example 5 of the aforesaid British specification), fifteen (15) parts of anhydrous sodium acetate, four (4) parts of cuprous chlorid, and three hundred (300) parts of nitrobenzene. Dilute the cold reaction product with alcohol, filter off, and wash, and dry the coloring matter, which consists of a blackish brown powder having a metallic luster. In sulfuric acid it yields a violet-blue non-fluorescent solution. It is practically insoluble in most organic solvents. Quinolin dissolves traces of it yielding a brown-red solution. With caustic soda and hydrosulfite it yields a greenish brown vat which colors cotton olive-green, and these shades, on washing and drying, become brown-red.

Example 3. Boil together ten (10) parts of monoaminobenzanthronequinolin (obtainable by reducing the nitro compound described in example 3 of the aforesaid British specification), ten (10) parts of sodium acetate, four (4) parts of cuprous chlorid, and one hundred and fifty (150) parts of naphthalene, until the amino compound is completely converted into coloring matter. Allow the reaction product to cool to about fifty (50) degrees centigrade and dilute with toluene; filter off and wash and dry the coloring matter which separates out and which is a blackish brown powder which yields a dull green solution in concentrated sulfuric acid. It is very difficultly soluble in organic solvents; nitrobenzene and quinolin dissolve traces of it yielding brown solutions. With caustic soda and hydrosulfite it yields a brownish red vat which colors cotton brown-red shades; which, on washing and drying, become a beautiful brown. A similar coloring matter can be obtained from bromaminobenzanthronequinolin.

Example 4. Boil together, for from five (5), to six (6), hours, five (5) parts of triaminobenzanthrone (obtainable by nitrating mononitrobenzanthrone with fuming nitric acid and reducing the trinitrobenzanthrone so obtained), eight (8) parts of sodium acetate, two (2) parts of cuprous chlorid, and one hundred and fifty (150) parts of nitrobenzene, and work up the reaction product as described in the foregoing Example 1. The coloring matter consists of a dark brown paste, and, when dry, of a blackish brown powder which dissolves in concentrated sulfuric acid yielding a red-brown solution with a dark green fluorescence. The new coloring matter is practically insoluble in organic solvents. With caustic soda and hydrosulfite it yields a red-brown vat which dyes vegetable fiber violet-brown.

Example 5. Boil together ten (10) parts of monoaminobenzanthrone, eight (8) parts of sodium acetate, four (4) parts of anhydrous ferric chlorid, and one hundred and fifty (150) parts of nitrobenzene, until a test portion shows that no unaltered aminobenzanthrone is present. Allow the mixture to cool, add alcohol, and filter off the coloring matter, which is similar to that obtained according to the foregoing Example 1.

Example 6. Boil together for five (5) hours, six (6) parts of aminobenzanthronequinolin, six (6) parts of anhydrous sodium acetate, six (6) parts of mercuric chloride, and one hundred and fifty (150) parts of nitrobenzene, and then work up the mixture as described in the foregoing example 3. The coloring matter obtained is similar to that described in the said example 3.

Example 7. Boil together, for about six (6) hours, ten (10) parts of monoaminobenzanthrone (prepared by reducing the nitro compound obtained according to Example 1 of the specification of British Letters Patent No. 12,518/06), six (6) parts of cuprous oxid, and two hundred and fifty (250) parts of nitrobenzene. When the reaction mixture is cold add alcohol and filter off the coloring matter which separates out. It can be obtained in a pure state by dissolving it in sulfuric acid and precipitating by means of water and then extracting it with a solution of sodium hypochlorite. The coloring matter thus obtained yields, in concentrated sulfuric acid, a violet-brown solution with a red-brown fluorescence, and dyes vegetable fiber from a vat fast yellow shades and is otherwise similar in its properties to the coloring matter obtained according to the foregoing Example 1.

Example 8. Boil together five (5) parts of diaminobenzanthrone (obtainable by reducing the nitro compound described in Example 5 of the aforesaid British specification), five (5) parts of mercuric oxid, and one hundred and sixty (160) parts of nitrobenzene, and continue boiling until the formation of coloring matter is complete. When the mixture is cold, add alcohol and pour the liquid off from the metallic mercury formed. The coloring matter can be isolated in the manner described in the foregoing Example 7; it dyes cotton brown-red shades and is otherwise similar to the coloring matter obtained according to the foregoing Example 2.

Example 9. Boil six (6) parts of monoaminobenzanthronequinolin (obtainable by reducing the nitro compound described in Example 3 of the aforesaid British specification) with six hundred (600) parts of glacial acetic acid, and add gradually, while boiling, a solution of four (4) parts of chromic acid in two hundred (200) parts of glacial acetic acid. After from three (3), to four (4), hours, pour the mixture into a considerable quantity of water, filter off the coloring matter which separates out, wash it with water and then extract it with boiling dilute sodium hypochlorite solution. The reddish-brown paste obtained dyes cotton, from the vat, brown and is otherwise similar to the coloring matter obtained according to the foregoing Example 3.

Example 10. Boil together three (3) parts of triaminobenzanthrone (obtainable by nitrating mononitrobenzanthrone with fuming nitric acid and reducing the trinitrobenzanthrone so obtained), two (2) parts of lead peroxid, and one hundred and fifty (150) parts of nitrobenzene. When the formation of coloring matter is complete, add alcohol to the cooled mixture and filter off the coloring matter, wash it with alcohol and water, and then boil it with dilute nitric acid in order to extract any lead oxid present. The coloring matter thus obtained dyes cotton, from the vat, violet-brown and is otherwise similar to the coloring matter obtained according to the foregoing Example 4.

Now what I claim is:

1. The process of producing coloring matter of the anthracene series by treating an amino derivative of a compound containing the benzanthrone grouping with a metallic salt or oxid which acts as a condensing agent.

2. The process of producing coloring matter of the anthracene series by treating an amino derivative of a compound containing the benzanthrone grouping with cuprous chlorid.

3. The process of producing coloring matter of the anthracene series by treating monoaminobenzanthrone with cuprous chlorid.

4. As new articles of manufacture the coloring matters of the anthracene series which can be obtained by treating an amino derivative of a compound containing the benzanthrone grouping with a metallic salt or oxid which acts as a condensing agent which coloring matters are characterized by being insoluble in water and in dilute acids and alkalies, difficultly soluble in quinolin yielding brown to brown-red solutions, soluble in concentrated sulfuric acid yielding from reddish brown to violet-blue solutions and soluble in alkaline hydrosulfite solution yielding olive-green to brown-red vats which dye unmordanted cotton yellow to violet-brown shades.

5. As a new article of manufacture the coloring matter of the anthracene series which can be obtained by treating monoamino-benzanthrone with cuprous chlorid, which coloring matter is insoluble in water and in dilute acids and alkalies, difficultly soluble in quinolin yielding a brown solution, soluble in concentrated sulfuric acid yielding a violet-blue solution with a brown-red fluorescence and soluble in alkaline hydrosulfite solution yielding an olive-green vat which dyes unmordanted cotton yellow.

In testimony whereof I have hereunto set my hand in the presence of two subscribing witnesses.

HUGO WOLFF.

Witnesses:
J. ALEC. LLOYD,
ERNEST G. EHRHARDT.